United States Patent
Brizard (10) Patent No.: US 9,417,351 B2
(45) Date of Patent: Aug. 16, 2016

(54) MARINE SEISMIC SURVEYS USING CLUSTERS OF AUTONOMOUS UNDERWATER VEHICLES

(71) Applicant: CGG SERVICES SA, Massy (FR)

(72) Inventor: Thierry Brizard, Massy (FR)

(73) Assignee: CGG SERVICES SA, Massy (FR)

( * ) Notice: Subject to any disclaimer, the term of this patent is extended or adjusted under 35 U.S.C. 154(b) by 314 days.

(21) Appl. No.: 14/104,376

(22) Filed: Dec. 12, 2013

(65) Prior Publication Data

US 2014/0177387 A1    Jun. 26, 2014

Related U.S. Application Data

(60) Provisional application No. 61/740,493, filed on Dec. 21, 2012, provisional application No. 61/752,176, filed on Jan. 14, 2013.

(51) Int. Cl.
*G01V 1/38* (2006.01)

(52) U.S. Cl.
CPC ............ *G01V 1/3808* (2013.01); *G01V 1/3843* (2013.01)

(58) Field of Classification Search
CPC ..................... G01V 1/3843; G01V 1/3808
USPC ............................................................. 367/15
See application file for complete search history.

(56) References Cited

U.S. PATENT DOCUMENTS

| | | | | |
|---|---|---|---|---|
| 5,198,607 A | * | 3/1993 | Livingston | F41H 13/0062 89/1.11 |
| 5,253,605 A | * | 10/1993 | Collins | B63B 21/66 114/258 |
| 5,894,450 A | * | 4/1999 | Schmidt | H04B 13/02 367/131 |
| 6,044,745 A | * | 4/2000 | Hickey | B63C 11/40 102/399 |
| 6,390,012 B1 | * | 5/2002 | Watt | B63B 27/36 114/322 |
| 6,474,254 B1 | * | 11/2002 | Ambs | B63B 21/66 114/312 |
| 6,625,083 B2 | * | 9/2003 | Vandenbroucke | G01V 1/3852 181/112 |
| 6,779,475 B1 | * | 8/2004 | Crane | B63B 27/10 114/258 |
| 6,932,185 B2 | * | 8/2005 | Bary | G01V 1/38 181/110 |

(Continued)

FOREIGN PATENT DOCUMENTS

WO            99/34238 A1       7/1999

OTHER PUBLICATIONS

Bluetooth SIG. Bluetooth Specification Version 2.1 + EDR. Adopted on Jul. 26, 2007. https://www.bluetooth.org/docman/handlers/downloaddoc.ashx?doc_id=241363 Downloaded Dec. 14, 2015. 216—page excerpt of assorted pages in file.*

(Continued)

*Primary Examiner* — Daniel L Murphy
(74) *Attorney, Agent, or Firm* — Patent Portfolio Builders PLLC (57) ABSTRACT

A seismic survey system records seismic signals during a marine seismic survey. The system includes first and second clusters, each including a set of autonomous underwater vehicles (AUVs); each cluster being associated with a corresponding first or second unmanned surface vehicle (USV); and a central control unit located on a floating platform and configured to control the first and second USVs. The first USV follows its own path and the first cluster follows the first USV independent of the second USV or the second cluster.

20 Claims, 9 Drawing Sheets

(56) References Cited

U.S. PATENT DOCUMENTS

| | | | |
|---|---|---|---|
| 7,025,014 B1 | 4/2006 | Forgach et al. | |
| 7,965,583 B2 * | 6/2011 | Thomas | G01V 1/3808 367/16 |
| 8,109,223 B2 * | 2/2012 | Jamieson | B63G 8/001 114/312 |
| 8,244,469 B2 * | 8/2012 | Cheung | G01S 7/003 700/248 |
| 8,473,101 B2 * | 6/2013 | Summer | B25J 9/162 318/568.11 |
| 8,717,844 B2 * | 5/2014 | Welker | B63B 27/36 181/122 |
| 2005/0122914 A1 * | 6/2005 | Durso | H04L 1/206 370/270 |
| 2005/0195096 A1 * | 9/2005 | Ward | G01C 21/32 340/995.14 |
| 2006/0085106 A1 * | 4/2006 | Gaudiano | G01C 11/00 701/23 |
| 2008/0144442 A1 * | 6/2008 | Combee | G01V 1/22 367/131 |
| 2008/0158256 A1 * | 7/2008 | Russell | G06T 7/0026 345/629 |
| 2008/0225643 A1 * | 9/2008 | Vosburgh | H04B 13/02 367/131 |
| 2010/0017046 A1 * | 1/2010 | Cheung | G01S 7/003 701/2 |
| 2010/0157727 A1 * | 6/2010 | Woodard, Jr. | B63C 11/52 367/15 |
| 2010/0302901 A1 * | 12/2010 | Welker | G01V 1/3843 367/21 |
| 2011/0216625 A1 * | 9/2011 | Manin | G01V 1/38 367/15 |
| 2012/0069702 A1 * | 3/2012 | Muyzert | G01V 1/3808 367/15 |
| 2014/0321236 A1 * | 10/2014 | Lelaurin | E02D 29/06 367/15 |

OTHER PUBLICATIONS

International Search Report mailed Jun. 26, 2014, in related International Application No. PCT/EP2013/077540.

Written Opinion of the International Searching Authority mailed Jun. 26, 2014, in related International Application No. PCT/EP2013/077540.

* cited by examiner

MARINE SEISMIC SURVEYS USING CLUSTERS OF AUTONOMOUS UNDERWATER VEHICLES

CROSS REFERENCE TO RELATED APPLICATIONS

The present application claims the benefit of priority under 35 U.S.C. §119(e) to U.S. Provisional Application Nos. 61/740,493 filed on Dec. 21, 2012 and 61/752,176 filed on Jan. 14, 2013. The entire contents of these documents are hereby incorporated by reference into the present application.

BACKGROUND

1. Technical Field

Embodiments of the subject matter disclosed herein generally relate to methods and systems and, more particularly, to mechanisms and techniques for using clusters of autonomous underwater vehicles (AUVs) that carry seismic sensors for performing a marine seismic survey.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends the energy into the earth. By measuring the time it takes for the reflections and/or refractions to come back to plural receivers, it is possible to evaluate the depth of features causing such reflections. These features may be associated with subterranean hydrocarbon deposits.

A traditional system for generating seismic waves and recording their reflections off the geological structures present in the subsurface includes a vessel that tows an array of seismic receivers provided on streamers. The streamers may be disposed horizontally, i.e., lying at a constant depth relative to the ocean surface. The streamers may have other than horizontal spatial arrangements. The vessel also tows a seismic source array configured to generate a seismic wave. The seismic wave propagates downward and penetrates the seafloor until eventually a reflecting structure (reflector) reflects the seismic wave. The reflected seismic wave propagates upward until detected by the receiver(s) on the streamer(s). Based on the data collected by the receiver(s), an image of the subsurface is generated.

However, this traditional configuration is expensive because the cost of streamers is high. Further, due to the great length of the streamers, e.g., 10 km, the streamer array is difficult to maneuver around various obstacles, e.g., an oil platform. New technologies deploy plural seismic sensors on the bottom of the ocean (ocean bottom stations) to avoid this problem. Even so, positioning the seismic sensors remains a challenge.

Such technologies use permanent receivers set on the ocean bottom, as disclosed in U.S. Pat. No. 6,932,185, the entire content of which is incorporated herein by reference. In this case, the seismic sensors are attached to a heavy pedestal. A station that includes the sensors is launched from a vessel and arrives, due to its gravity, at a desired position and remains on the bottom of the ocean permanently. Data recorded by sensors is transferred through a cable to a mobile station. When necessary, the mobile station may be brought to the surface for data retrieval.

Although the ocean bottom nodes better handle the various obstacles present in the water, using them is still expensive and difficult because the sensors and corresponding pedestals are left on the seafloor. Further, positioning the sensors is not straightforward.

An improved approach to these problems is the use of plural (e.g., thousands) AUVs for carrying the seismic sensors and collecting the seismic data. The AUVs may be launched from a deployment vessel, guided to a final destination on the ocean bottom, instructed to record the seismic data, and then instructed to surface for retrieval. However, many challenges remain with the use of a large number of AUVs for collecting seismic data. One such challenge is the management of thousands of AUVs, maintaining the AUVs at desired positions while performing the survey, and/or retrieving all these AUVs.

Accordingly, it would be desirable to have systems and methods that provide an inexpensive and simple way to perform a seismic survey without the problems identified above.

SUMMARY

According to one exemplary embodiment, there is a seismic survey system for recording seismic signals during a marine seismic survey which includes first and second clusters, each including a set of AUVs; each cluster being associated with a corresponding first or second unmanned surface vehicle (USV); and a central control unit located on a floating platform and configured to control the first and second USVs. The first USV follows its own path, and the first cluster follows the first USV, independent of the second USV or the second cluster.

According to another exemplary embodiment, there is a method for recording seismic data using a seismic survey system. The method includes a step of deploying first and second clusters, each including a set of AUVs; a step of assigning to each cluster a corresponding first or second USV; a step of remote controlling, from a central control unit located on a floating platform, the first and second USVs; and a step of recording the seismic data with the first and second clusters. The first USV follows its own path, and the first cluster follows the first USV, independent of the second USV or the second cluster.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having one or more seismic sensors. However, the embodiments to be discussed next are not limited to AUVs, but may be applied to other platforms (e.g., glider, buoy, etc.) that may carry seismic sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers at the ocean bottom. According to an exemplary embodiment, such a seismic system includes plural AUVs, each having one or more seismic sensors. The seismic sensors may be one of a hydrophone, geophone, accelerometers, electromagnetic sensors, etc. If an electromagnetic sensor is used, then a source that emits electromagnetic waves may be used instead of or in addition to an acoustic source.

The AUV may be a specially designed device or an inexpensive off-the-shelf device that may be quickly retrofitted or modified to include the seismic sensors and necessary communications means to be discussed later. The AUV may include, besides or in addition to a propulsion system, a buoyancy system. The buoyancy system may be a multi-phase system as discussed later. A deployment vessel may store and launch the AUVs as necessary for the seismic survey. The AUVs find their target positions using, for example, an inertial navigation system, or another means. Thus, the AUVs may be preprogrammed or partially programmed to find their target positions. If an AUV is partially programmed, the final detail for finding the target position may be received, e.g., acoustically, from the vessel when the AUV is launched from the vessel and/or while the AUV is navigating underwater. In one embodiment, reference is made to a deployment vessel and/or a recovery vessel. Note that these vessels may be identical from an equipment standpoint. However, the vessels may be operated as a recovery vessel or as a deployment vessel. In other words, a recovery vessel may be instructed, after having enough AUVs on board, to become a deployment vessel, and vice versa. When the document refers to a vessel, it might be the recovery vessel, the launching vessel or both of them.

As the deployment vessel is launching the AUVs, a shooting vessel may follow the deployment vessel for generating seismic waves. The shooting vessel may tow one or more seismic source arrays. The seismic source array may include plural individual seismic sources that may be arranged on a horizontal line, slanted line or curved line underwater. The individual seismic source may be an air gun, a vibrational source or other known seismic sources. The shooting vessel or another vessel, e.g., the recovery vessel, may then instruct selected AUVs to resurface so they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake up the AUVs and instruct them to return to the surface for recovery.

In one exemplary embodiment, the AUVs number in the thousands. Thus, the deployment vessel is configured to hold all of them at the beginning of the survey and then to launch them as the survey advances. If the shooting vessel is configured to retrieve the AUVs, when the number of available AUVs at the deployment vessel falls below a predetermined threshold, the shooting vessel and the deployment vessel are instructed to switch positions in mid-survey. If a dedicated recovery vessel is used to recover the AUVs, then the deployment vessel is configured to switch positions with the recovery vessel when the deployment vessel becomes empty. In another exemplary embodiment, both vessels are full of AUVs. The first one starts deploying the AUVs, and the second one just follows the first one. Once the first one has deployed most or all of the AUVs, this vessel becomes the recovery vessel and the second one starts deploying AUVs, thus becoming the deployment vessel. Later, the two vessels may switch functions as necessary.

In an exemplary embodiment, the seismic survey is performed as a combination of AUV seismic sensors and streamer seismic sensors towed by the deployment vessel, the shooting vessel or both of them.

In still another exemplary embodiment, when selected AUVs are instructed to surface, they may be programmed to go to a desired rendezvous point where they will be collected by the shooting vessel, the deployment vessel or the recovery vessel. The selected AUVs may belong to a given row or column if a row and column arrangement is used. The shooting and/or deployment or recovery vessel may be configured to send acoustic signals to the returning AUVs to guide them to the desired position. The AUVs may be configured to rise to a given altitude, execute the return path at that altitude, and then surface for recovery. In one exemplary embodiment, the AUVs are configured to communicate among themselves so they follow each other back to the recovery vessel, or they communicate among themselves to establish a queue in which to be retrieved by the shooting, recovery or deployment vessel.

Once on the vessel, the AUVs are checked for problems, their batteries may be recharged or replaced, and the stored seismic data may be transferred to the vessel for processing. Alternatively or in addition, a compressed gas tank may be replaced or recharged for powering the AUV buoyancy system. The recovery vessel may store the AUVs on deck during maintenance or somewhere inside the vessel, e.g., inside a module, closed or open, that is fixed on the vessel or the vessel's deck. A conveyor-type mechanism may be designed to recover the AUVs on one side of the vessel when the vessel is used as a recovery vessel, and to launch the AUVs from the other side of the vessel when the vessel is used for deployment. After maintenance, the AUVs are redeployed as the seismic survey continues. Thus, in one exemplary embodiment the AUVs are continuously deployed and retrieved. In still another exemplary embodiment, the AUVs are configured to not transmit the seismic data to the deployment, recovery or shooting vessel while performing the seismic survey. This may be advantageous when the electrical power available on the AUV is limited. In another exemplary embodiment, each AUV has enough electrical power (stored in the battery) to be deployed only once, record seismic data and resurface for retrieval. Thus, reducing data transmission volume between the AUV and the vessel while the AUV is underwater conserves power and allows the AUV to be retrieved on the vessel before running out of power.

According to another embodiment, instead of using a large number of AUVs that interact with a single mother vessel, it is possible to deploy clusters of AUVs, each cluster having its own support vessel. In this case, the situation might be that there is a mother vessel storing all the AUVs. After the AUVs are deployed in the water, they are assigned to different clusters, and each cluster is assigned to an unmanned surface vessel (USV). The USV may be a small boat remotely controlled from the mother vessel. In one application, the USV is replaced with a (manned) vessel or a buoy. The USV follows a given path and all the AUVs in its cluster follow the designated USV. The number of AUVs in a cluster is small, tens to hundreds and, thus, the USV with its cluster can move around obstacles, e.g., an oil rig. Each cluster may have a different number of AUVs and the AUVs' pattern can differ from cluster to cluster. An AUV may enter a bay provided by the USV for minor maintenance, cleaning, battery charging, data transfer, etc., as needed.

Figure 1:
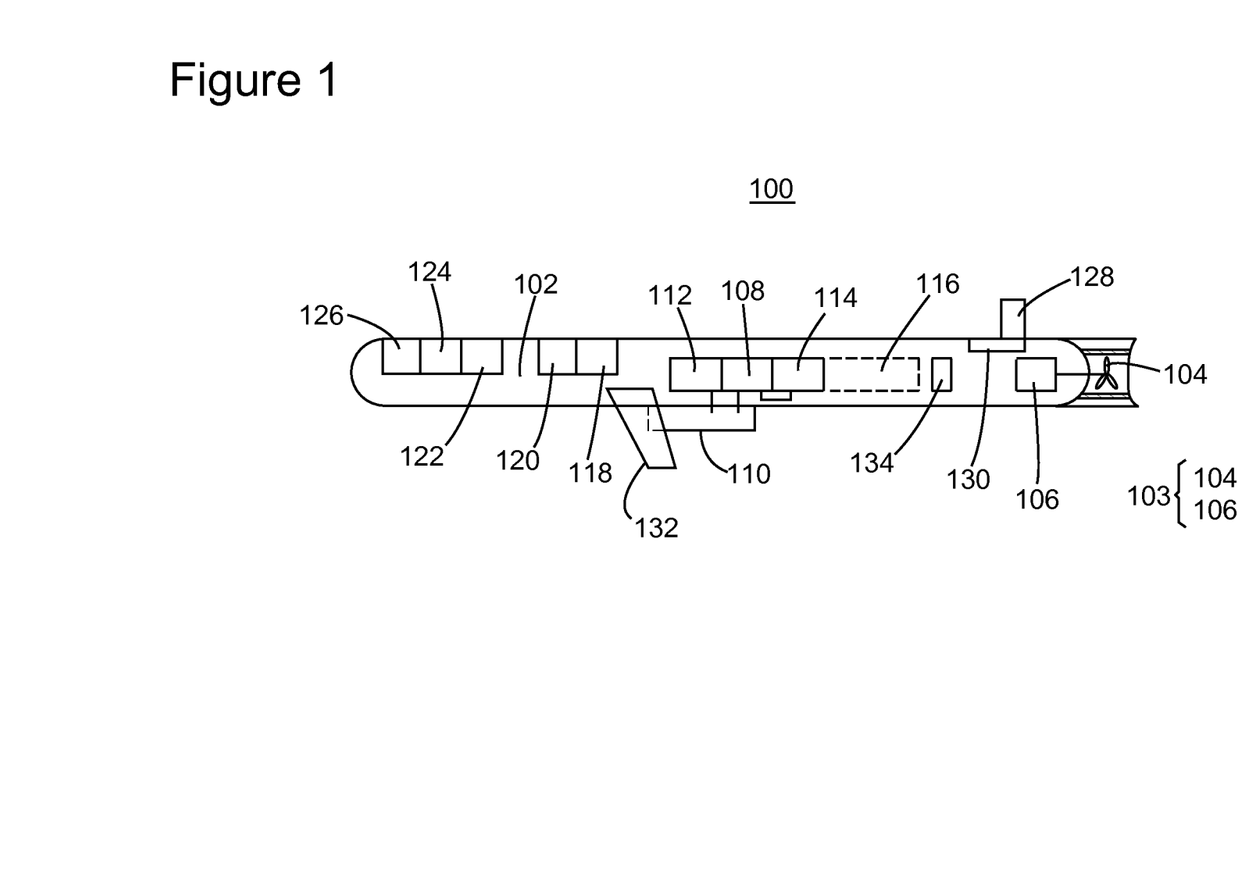
FIG. 1 is a schematic diagram of an AUV.

The above-noted embodiments are now discussed in more detail with regard to the figures. FIG. 1 illustrates an AUV 100 having a body 102 in which a propulsion system 103 may be located. Note that in one embodiment, there is no propulsion system. If the propulsion system 103 is available, it may include one or more propellers 104 and a motor 106 for activating the propeller 104. Alternatively, the propulsion system may include adjustable wings for controlling a trajectory of the AUV. The motor 106 may be controlled by a processor 108. The processor 108 may also be connected to a seismic sensor 110. The seismic sensor 110 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course, other sensor combinations are possible.

A memory unit 112 may be connected to the processor 108 and/or the seismic sensor 110 for storing seismic data recorded by the seismic sensor 110. A battery 114 may be used to power all these components. The battery 114 may be allowed to shift its position along a track 116 to change the AUV's center of gravity.

The AUV may also include an inertial navigation system (INS) 118 configured to guide the AUV to a desired location. An inertial navigation system includes at least a module containing accelerometers, gyroscopes or other motion-sensing devices. The INS is initially provided with the current position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation or velocity once it has been initialized. Further, using an INS is inexpensive.

Besides or instead of the INS 118, the AUV may include a compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless communication) or other data transfer device capable of wirelessly transferring seismic data. In one embodiment, the transfer of seismic data takes place while the AUV is on the vessel. Also, it is possible that the communication device 126 is a port wire-connected to the vessel to transfer the seismic data. One or more of these elements may be linked to the processor 108. The AUV further includes an antenna 128 (which may be flush with the AUV's body) and a corresponding acoustic system 130 for communicating with the deploying, recovery or shooting vessel or other vehicle. Stabilizing fins and/or wings 132 for guiding the AUV to the desired position may be used with the propulsion system 103 for steering the AUV. However, in one embodiment, the AUV has no fins or wings. The AUV may include a buoyancy system 134 for controlling the AUV's depth as will be discussed later.

The acoustic system 130 may be an Ultra-Short Baseline (USBL) system, also sometimes known as Super Short Base Line (SSBL), which uses a method of underwater acoustic positioning. A complete USBL system includes a transceiver mounted on a pole under a vessel, and a transponder/responder on the AUV. It also may include a depth sensor (not shown) and/or a heading sensor (not shown) for reducing the ambiguity generated by the acoustic system 130. A processor is used to calculate the AUV's position from the ranges and bearings the transceiver measures and also the depth or/and heading information. For example, the transceiver transmits an acoustic pulse that is detected by the subsea transponder, which replies with its own acoustic pulse. This return pulse is detected by the transceiver on the vessel. The time from transmission of the initial acoustic pulse until the reply is detected is measured by the USBL system and converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 2:
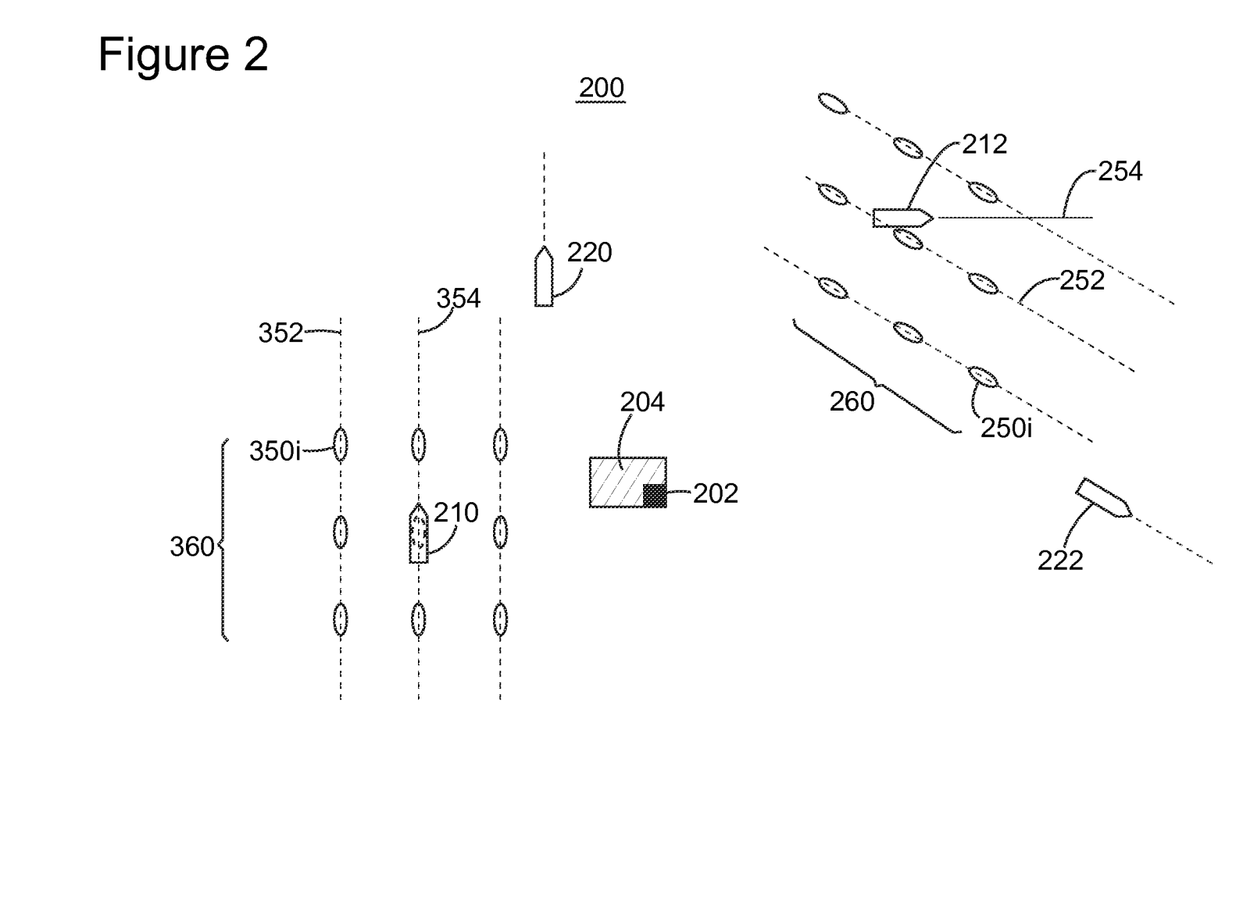
FIG. 2 is a schematic diagram of a seismic survey system including plural clusters of AUVs according to an exemplary embodiment.
Figure 3:
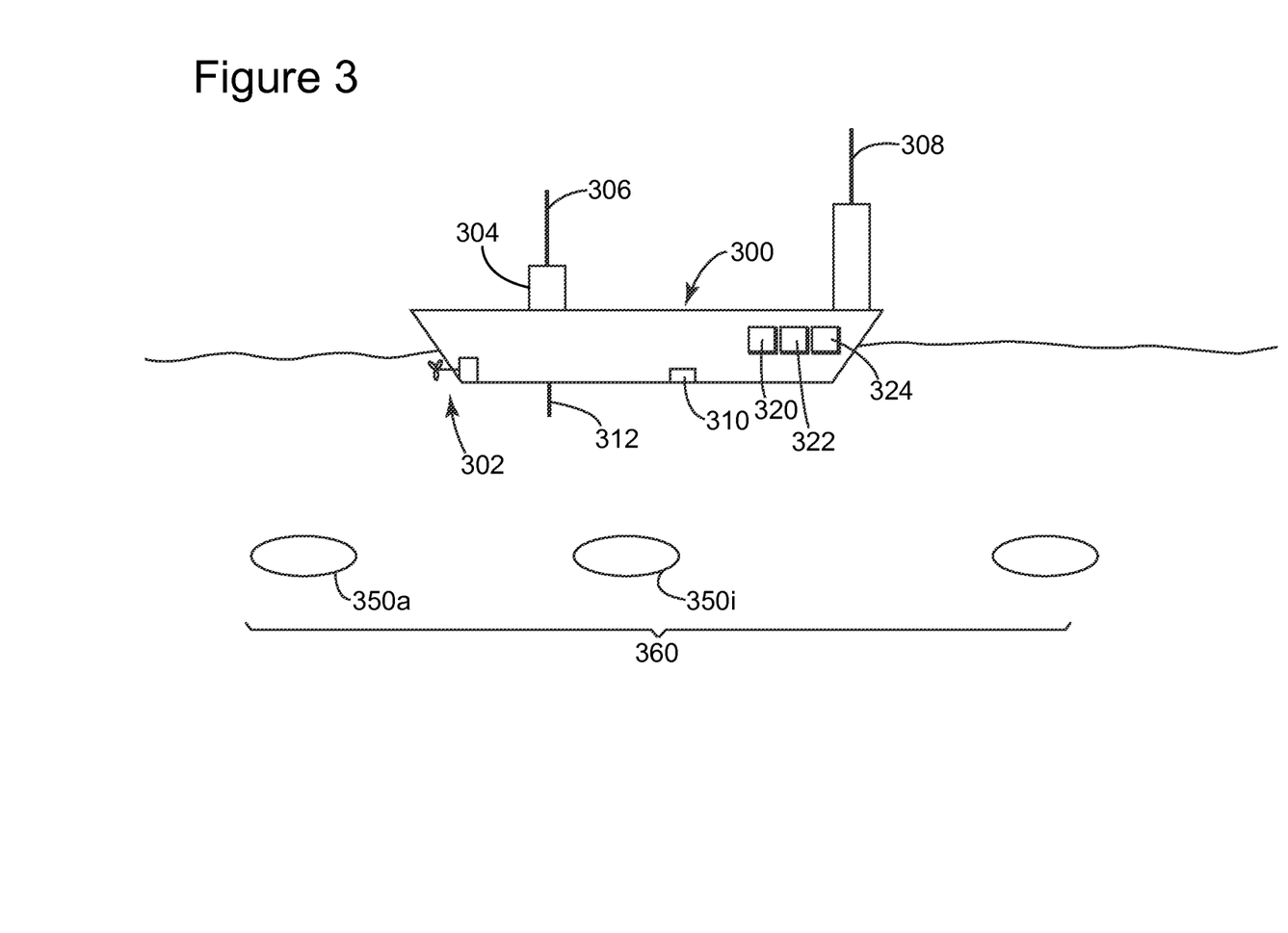
FIG. 3 is a schematic view of a cluster and corresponding unmanned surface vessel according to an exemplary embodiment.

The AUV 100 illustrated in FIG. 1 is exemplary. Other AUVs may be used for the novel method to be discussed next. As illustrated in FIG. 2, a seismic survey system 200 may include a central control unit 202 located on, for example, an oil rig 204. In another exemplary embodiment, the central control unit 202 is located on a vessel. The central control unit 202 is in radio communication with one or more unmanned surface vehicles (USVs) 210 and 212. More than two USVs may be used. A USV, as illustrated in FIG. 3, may be a boat 300 (e.g., small size boat) having a propulsion system 302 and an intermediate control unit 304 that is in radio communication with the central control unit 202. The boat 300 may have an antenna 306 for communicating with the oil rig 204, and a GPS system 308 for obtaining accurate position information. The USV 300 may also include an acoustic modem 310 for communicating with AUVs 350$i$, and/or an acoustic underwater positioning and navigation (AUPN) system 312 for detecting the location of the AUVs 350$i$. An example of an AUPN system 312 is discussed later. Thus, USV 300 is capable of locating each AUV 350*i* in a cluster 360 of AUVs. USV 300 may also include a processor 320, a storage device 322 for storing information (e.g., seismic data, location information, quality control data, etc.), and a battery 324 or another power source. In one application, USV 300 is a small boat with no personnel on board that is remotely controlled by the central control unit 202.

Returning to FIG. 2, note that each USV 210 and 212 has its own cluster (swarm, set, or array) 360 or 260 of AUVs. In an exemplary embodiment, a cluster of AUVs may include a few AUVs to tens of AUVs. Also note that AUV patterns in each cluster may be different. For example, cluster 360 has a row and column arrangement in which all AUVs follow lines 352 parallel to the traveling direction 354 of USV 210, while in cluster 260, AUVs 250*i* are grouped along parallel lines 252 that form an angle different than zero with a traveling direction 254 of USV 212. Other AUV patterns may be imagined and implemented. Further, the number of AUVs in each cluster may differ.

One or more source vessels 220 and 222 may be used to generate the acoustic waves. In one exemplary embodiment, each AUV cluster has its own source vessel. In another exemplary embodiment, the same source vessel may be shared by multiple clusters. However, in still another exemplary embodiment, plural source vessels may be assigned to a single cluster.

A seismic survey based on AUV clusters, in which each cluster has its own USV, is performed as follows. The central control unit 202 instructs each USV to follow a given path (e.g., 254 for USV 212). Further, central control unit 202 may instruct each USV on how many AUVs and which pattern to use. With this information, intermediate control unit 304 of each USV instructs its associated AUVs to follow the travel path and to assemble based on the assigned pattern. Thus, USV 210 instructs its AUVs 350*i* to follow the travel path 354 and also to maintain the assigned pattern. The AUVs may be configured to communicate among themselves, for example, for sharing their location information.

Communication between the central and intermediate control units is radio-based, while communication between the intermediate control units and the AUVs is acoustic-based. Other known and appropriate means for communication may be used. With such a configuration, the management of AUVs is improved because each USV interacts with a limited number of AUVs (not thousands), and the maneuverability of an AUV cluster is improved because such a small number of AUVs can easily move around any obstacle, e.g., the oil rig 204. Seismic survey cost is also reduced comparative to traditional AUV-based surveys because smaller boats are used and the number of persons necessary to control the survey is limited (it is expected that two to three persons are needed on the oil rig to supervise the entire seismic survey, as opposed to tens, if not hundreds, of persons needed for a traditional boat with streamers).

Those skilled in the art know that when recording the seismic data, the AUVs need to know their location so that each recorded trace is associated with a correct position. Because the AUVs are designed to move underwater, e.g., between depths of 300 and 3,000 m, the use of GPS systems on the AUVs is not possible because electromagnetic waves do not travel so far in water. However, this novel process uses the GPS on the USV to determine the exact location of each USV, and then the USV uses its AUPN to determine the position of each AUV in its cluster. This position is then transmitted to the AUVs using, for example, the acoustic modem. Thus, each AUV in the cluster receives its location at given time intervals, as appropriate for accurately associating the recorded traces with their positions.

Figure 4:
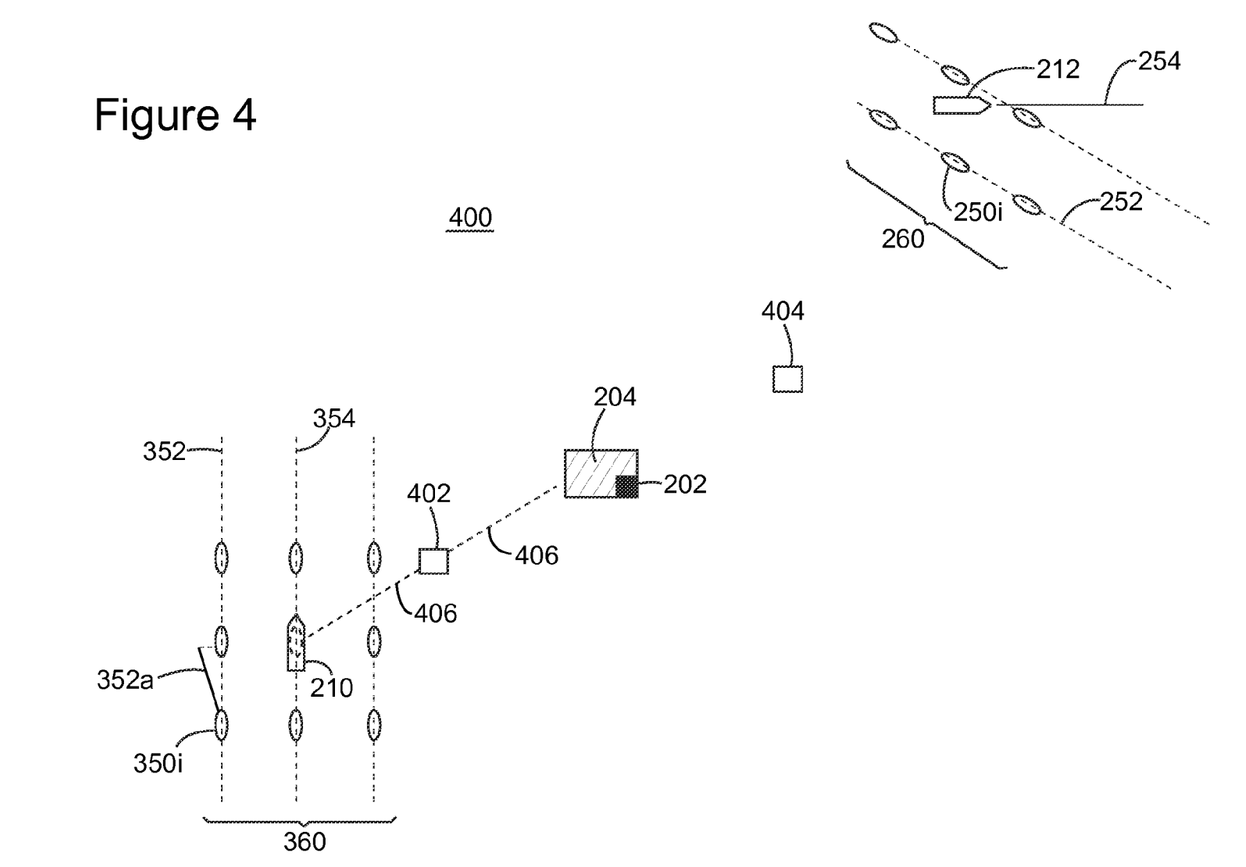
FIG. 4 is a schematic diagram of another seismic survey system including plural clusters of AUVs according to an exemplary embodiment.

According to another exemplary embodiment illustrated in FIG. 4, to extend the range of the USVs, the seismic survey 400 includes, in addition to the elements illustrated in FIGS. 2 and 3, base stations 402 and 404. Base stations may be fixed or movable USVs that have communication capabilities (e.g., radio communication systems) for transmitting commands from the central control unit 202 to the intermediate control units of USVs 210 and 212, and also for transmitting information back from USVs 210 and 212 to central control unit 202. These communication links 406 may extend from hundreds to thousands of meters. While seismic data may be transmitted from AUVs to USVs and to the oil rig, it is more likely that quality control (QC) data and other information is sent from USVs to the oil rig.

Figure 5:
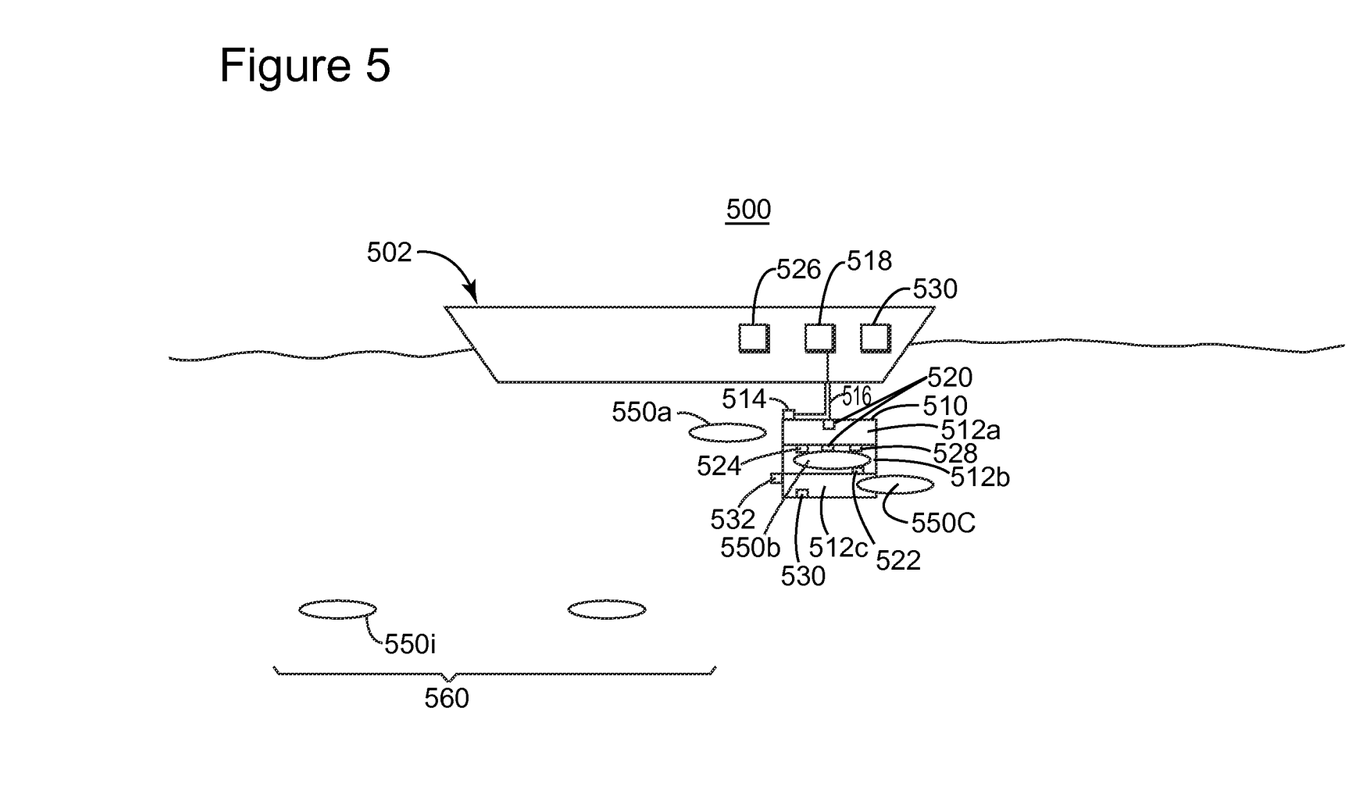
FIG. 5 is a side-section view of an unmanned surface vessel and corresponding AUVs according to an exemplary embodiment.

While the recorded seismic data may be transmitted from AUVs to corresponding USV through acoustic means while the seismic survey is performed, according to an exemplary embodiment, the seismic data is transferred as discussed next, from AUVs to USVs. As illustrated in FIG. 5, a seismic survey 500 includes, among others, a USV 502 and plural AUVs 550*i* that form a cluster 560. The various devices or components located on the USV and discussed above are omitted for simplicity. However, USV 502 may include a cage or housing 510 attached underneath USV 502, underwater. Housing 510 may include plural bays 512*a-c* for receiving AUVs 550*i*. FIG. 5 illustrates an AUV 550*a* approaching the bay 512*a*, an AUV 550*b* being parked in the bay 512*b*, and an AUV 550*c* leaving its bay 512*c*.

After the AUV 550*b* is parked in the bay 512*b*, a number of processes may be performed. For example, the AUV 550*b* downloads its stored seismic data to a storage device 514 located on the housing 510. The seismic data from the storage device 514 may then be transferred through a cable 516 to a storage device 518 on USV 502. From here, the seismic data may be transferred to the oil rig or another desired location in different ways, for example, via a radio link, satellite communications, on a hard drive, on magnetic tapes, etc. The seismic data exchanged between AUV 550*b* and storage device 514 may take place through a wired or wireless interface 520. For the wireless case, it may be a Wi-Fi system, an acoustic system, etc. For the wired case, a movable connector (not shown) that is part of the interface 520 may be actuated to physically contact a corresponding connector located on the AUV's body. This connection may happen after the AUV is parked in the bay and secured with a locking mechanism 522 to prevent the AUV's unexpected movement inside the bay.

Simultaneously or concurrently, a power connector 524 located in each bay may be actuated to contact a corresponding power connector (not shown) on the AUV. Alternatively, the power connector 524 may be inductive, with no physical connection to the AUV necessary for transferring electrical power. The power connector 524 is connected to a generator 526 located on the USV and capable of providing electrical power. After the AUV's battery is recharged, the power connector 524 is removed from the AUV. The generator 526 on the USV may be a larger battery, a diesel generator, a solar panel, a hydro-generator or a combination of them.

The bays may also include a diagnostic tool 528 configured to communicate with the AUV and test various parameters associated with the AUV, e.g., the status of the battery, the status of the storage device, the quality of the seismic data, the status of the propulsion system, etc. FIG. 5 shows the diagnostic tool 528 separated from the interface 520 and the power connector 524. However, in one exemplary embodiment, two or more of these three devices are integrated in a single tool so there is only one physical connection between the bay and the AUV. Further, in another exemplary embodiment, there is no physical connection between the bay and these tools because all these processes may be achieved wirelessly.

Optionally, the bays include a cleaning device 530 for removing deposits or other objects attached to the body of the AUVs. For parking the AUVs in corresponding bays on the housing 510, a guiding system 532 may be provided at the entrance of each bay to guide the AUVs. Such a system is disclosed, for example, in patent application Ser. No. 13/616,327, the entire content of which is incorporated herein by reference.

Figure 6:
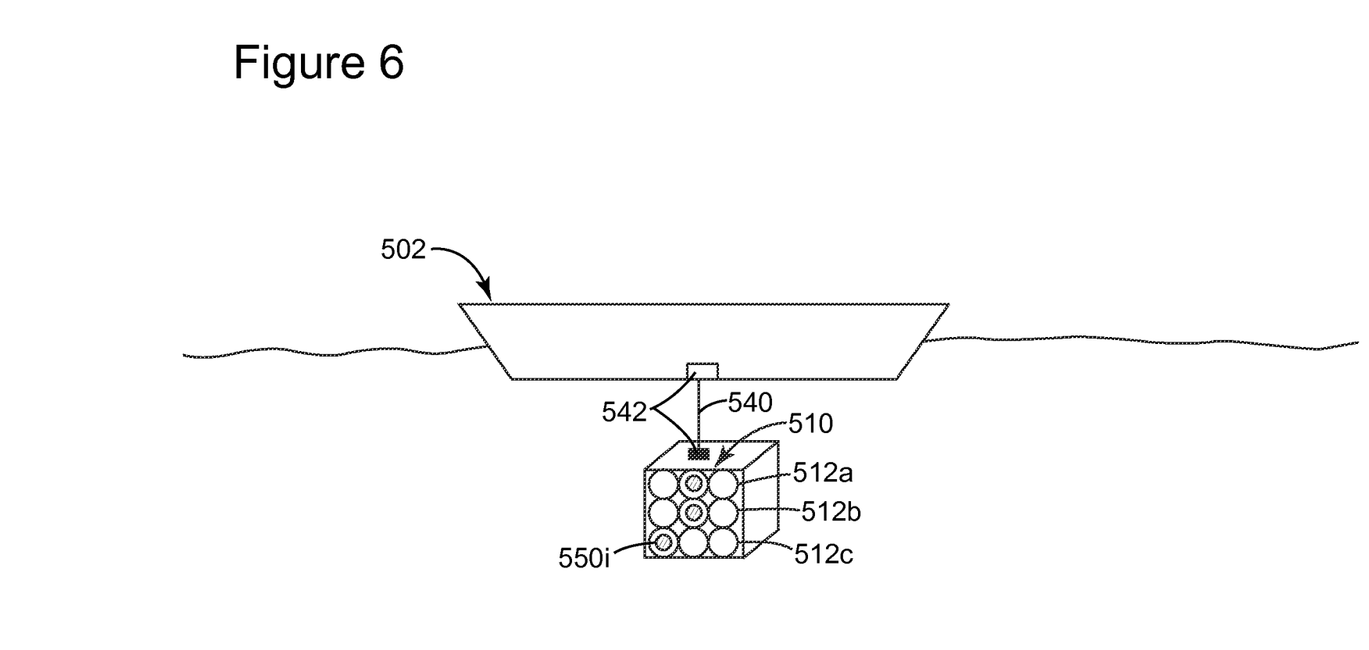
FIG. 6 is a cross-section view of an unmanned surface vessel and corresponding AUVs according to an exemplary embodiment.

A side view of the housing 510 is shown in FIG. 6, and a few AUVs 550i are also shown parked in corresponding bays. The strength link 540 between the housing 510 and the USV 502 may be adjusted by using, for example, an actuator 542 located either on the housing or on the USV. The actuator 542 may be a winch. The strength link 540 may also include power cables, data communication cables (e.g., optical cable), etc.

Next, some details of implementing the novel cluster-based seismic survey system are discussed. With regard to the AUV's shape, one possibility is the shape of a submarine. However, this shape may have various cross-sections, such as circular. In one exemplary embodiment, the AUV's cross-section is nearly a triangle. More specifically, the cross-section may be a triangle with round corners. This triangular-like shape may be advantageous when deploying or recovering the AUV in the housing connected to the USV. For example, the bays of the housing may have a similar triangular shape and rolling elements configured to rotate such that the AUV is engaged when entering the bay and then guided until the locking mechanism locks the AUV. The rolling elements may be located inside each bay so there is enough contact with the AUV that it does not slip. Other shapes may be imagined that could be handled by a launching device.

According to an exemplary embodiment, not all the AUVs of the cluster managed by a USV may fit at the same time in the housing 510. For example, if the cluster includes 60 AUVs, the housing 510 may have only 9 slots. These numbers are exemplary and not intended to limit the novel concepts. The idea is to have a light and flexible system attached to the USV for managing maintenance activities associated with performing the seismic survey with the AUV cluster. However, for recovering all the AUVs, a larger vessel (not shown) may be used. This vessel would then have a system as described in patent application Ser. No. 13/616,327 for storing all the AUVs, if necessary, on its deck. In this case, such a large boat may service many clusters.

Communication between the AUV and the USV vessel may take place based on various technologies, i.e., acoustic waves, electromagnetic waves, etc. According to an exemplary embodiment, an acoustic underwater positioning and navigation (AUPN) system may be used. The AUPN system may be installed on the USV and may communicate with the AUV's acoustic system 130.

The AUPN system may exhibit high accuracy and long-range performance in both positioning and telemetry modes. These features are obtained due to the automatic beam forming transducers, which focuses the sensitivity toward its targets or transponders. This beam can not only be pointed in any direction below the vessel, but also horizontally and even upward to the surface because the transducer is spherical.

Thus, AUPN may a hydro-acoustic Super Short Base Line—SSBL or USBL tow-tracking system, able to operate in shallow and deepwater areas to proven ranges in excess of 3,000 meters. It is a multi-purpose system used for a wide range of applications, including towfish and towed platform tracking, high-accuracy subsea positioning and telemetry and scientific research.

The AUPN is used to determine the AUV's position. In one embodiment, the AUV's actual position is measured with the AUPN and then provided to the AUV. The AUV may have an USBL sensor array configured to work with the USV's USBL system.

Figure 7:
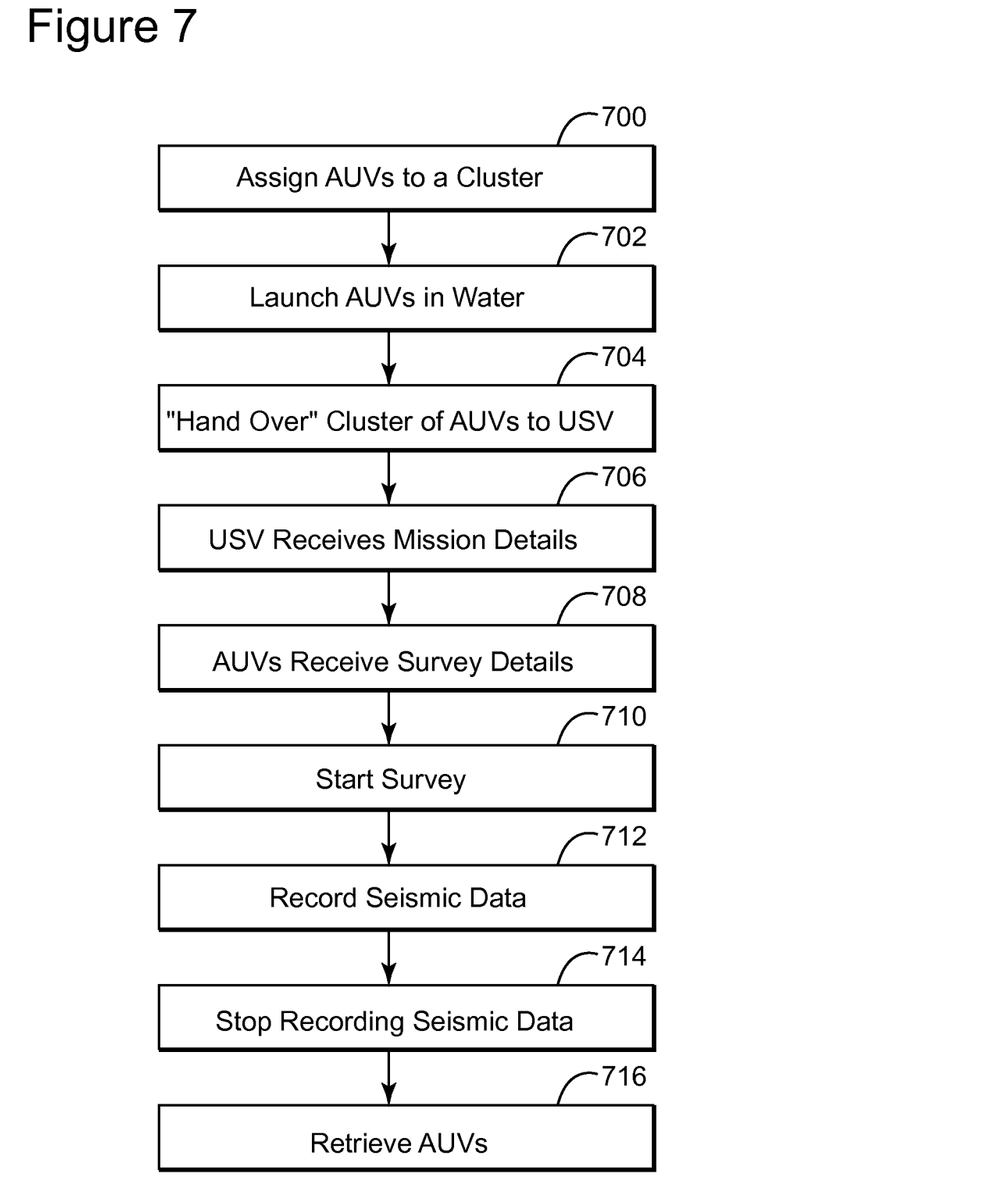
FIG. 7 is a flowchart of a method for collecting seismic data with plural clusters of AUVs according to an exemplary embodiment.

An embodiment for performing a seismic survey with clusters of AUVs is now discussed with reference to FIG. 7, which shows a step 700 in which plural AUVs are assigned to form a cluster. More than one cluster may be formed, depending on the requirements of the survey. The AUVs assigned to the cluster may be stored, initially, on a deployment vessel. In step 702, those AUVs are launched in water, and in step 704, the AUV cluster is "handed over" to a corresponding USV or another device, e.g., vessel, buoy, etc. At this time, control of the AUVs in the cluster is taken over by the intermediary control unit of the assigned USV. In step 706, the USV receives the details of the survey, i.e., area to be surveyed, its path, the pattern the AUVs need to take, the depth the AUVs need to achieve, etc. These details may be received over a radio link from the central control unit. Alternatively, an operator may directly program the USV's intermediate control unit and each local control unit of the AUVs with the details of the survey.

In step 708, the USV's intermediate control unit transmits, using the acoustic modem, the necessary information to each AUV in the cluster, e.g., velocity, path to be followed, location information, etc. Prior, during and after collecting the seismic data, the AUVs and the USV are in direct communication for constantly determining the AUVs' positions. Once the AUVs are in position (e.g., on intended paths 352), the seismic survey is started in step 710, and the USV instructs the AUVs in step 712 to record seismic data. The AUVs are configured to follow the survey path 352 sent at the beginning of the survey while recording the seismic data. Because the USV updates them about their positions, the AUVs are capable of correcting and/or adjusting their trajectories in real time to match the originally-provided trajectories. For example, if a trajectory 352a of AUV 350i deviates from intended path 352, it may be corrected between source shots as illustrated in FIG. 4. USV may travel together with the AUV cluster during the seismic survey. In one application, USV may control the AUVs up to 1 km distance, which gives the swarm of AUVs an length of about 1.5 km. In one exemplary embodiment, the USV positions itself at the cluster's center of gravity. The USV has the capability of adjusting the survey path in real time, if the operator of the central control unit desires. Thus, the seismic survey is very flexible and can be changed in short time and without intense preparations. During the seismic survey, each USV may follow its own path and each cluster may follow its own USV, independent of the other clusters or USVs.

In step 714, the USV instructs the AUVs in the cluster to stop recording the seismic data. Note that during the seismic survey, at any step, one or more AUVs may leave the pattern and approach the housing under the USV for various reasons. For example, if the AUV's local control unit determines that its battery is discharged (e.g., below a given threshold), the AUV can decide to approach a bay in the housing for recharging. In one exemplary embodiment, the AUV makes this decision by itself. However, in another exemplary embodiment, the AUV first requires permission from the USV, the USV checks that a bay is available, and then tells the AUV which bay to approach. Alternatively, if no bay is available, the USV instructs the AUV to wait. The AUV may need to approach a bay for other reasons, for example, a malfunction, a non-working seismic sensor, a full storage device, etc.

If no other seismic survey is envisioned next, the AUVs may be instructed to resurface (or move toward the surface) and are then retrieved by the mother vessel. In one embodiment, if a seismic survey is to be performed soon, the AUVs may be "parked" on the ocean bottom if its depth is not more than a few hundred meters and the ocean bottom currents are not too strong. Then, when the new seismic survey needs to be performed, the AUVs may be awakened by the corresponding USV.

Figure 8:
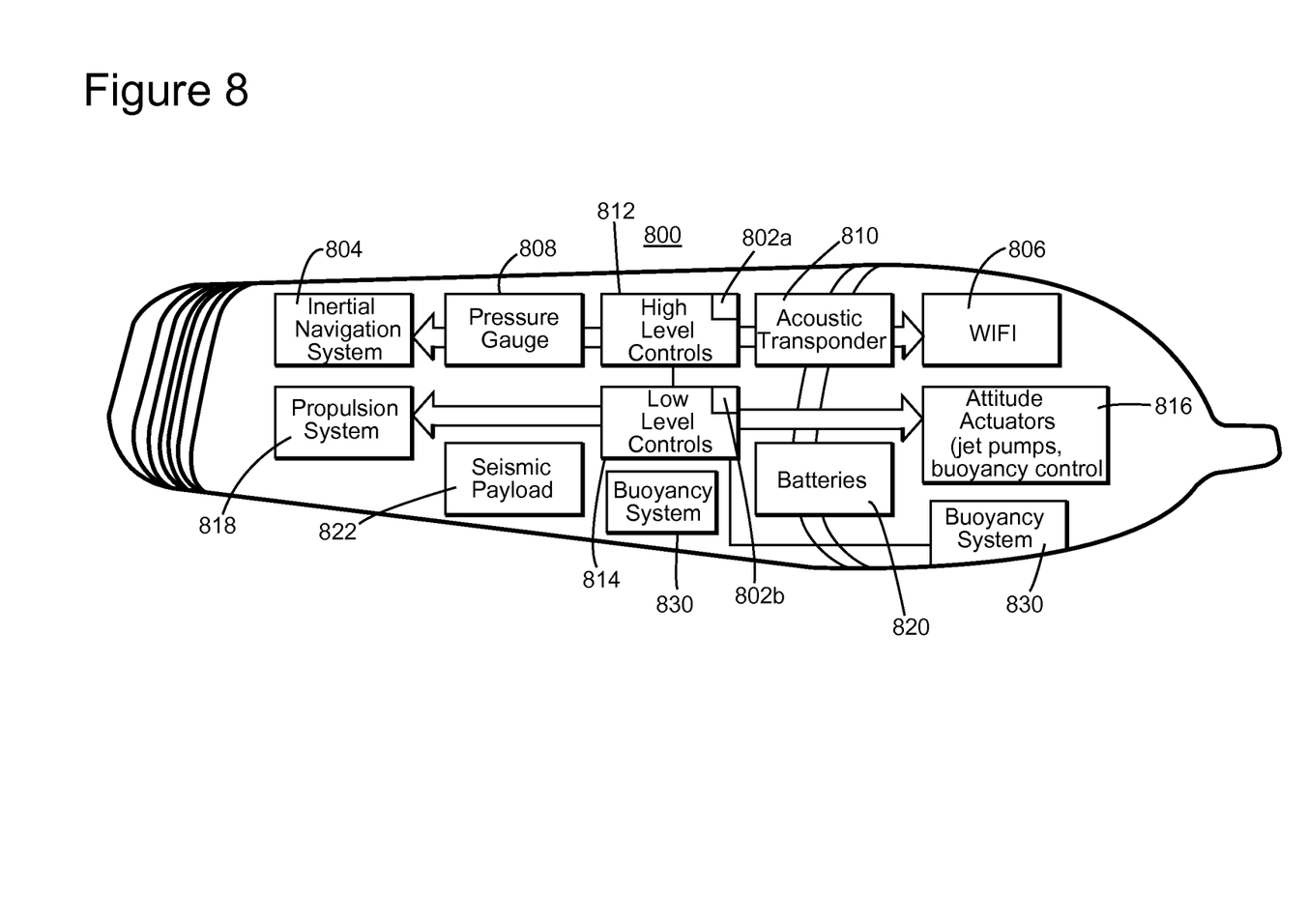
FIG. 8 is a schematic diagram of an AUV of a cluster.

With regard to the AUV's internal configuration, a possible arrangement is shown in FIG. 8, which shows an AUV 800 having a CPU 802a connected, for example, to an Inertial Navigation System (INS) 804 (or compass or altitude sensor and acoustic transmitter for receiving acoustic guidance from the mother vessel), wireless interface 806, pressure gauge 808 and transponder 810. The CPU 802a may be located in a high-level control block 812. The INS is advantageous when the AUV's trajectory has been changed, for example, by an encounter with an unexpected object, e.g., fish, debris, etc., because the INS is capable of taking the AUV to the desired final position as it does for currents, wave motion, etc. Also, the precision of the INS may be high. For example, it is expected that for a target having a depth of 300 m, the INS is capable of steering the AUV within +/−5 m of the desired target location. However, the INS may be configured to continuously receive data from the USV to increase its accuracy. Note that the AUV 800 may reach a depth of 3,000 m, for example, using the buoyancy system 830. A CPU 802b, in addition to the CPU 802a, is part of a low-level control module 814 configured to control attitude actuators 816 and the propulsion system 818. One or more batteries 820 may be located in the AUV 800. A seismic payload 822 (hydrophone, geophone, accelerometer, electromagnetic sensor, combination of them, etc.) is located inside the AUV for recording the seismic signals. Those skilled in the art would appreciate that more modules may be added to the AUV. For example, if a sensor is outside the AUV's body, a skirt may be provided around or next to the sensor.

Figure 9:
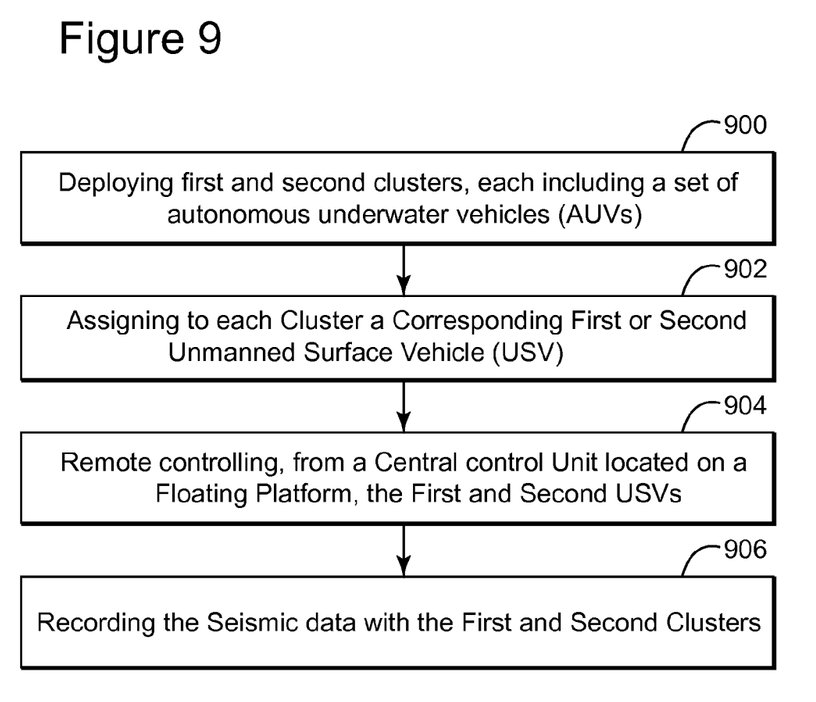
FIG. 9 is a flowchart of another method for collecting seismic data with plural clusters of AUVs according to an exemplary embodiment.

According to an exemplary embodiment illustrated in FIG. 9, there is a method for recording seismic data using a seismic survey system. The method includes a step 900 of deploying first and second clusters, each including a set of AUVs; a step 902 of assigning to each cluster a corresponding first or second USV; a step 904 of remote-controlling, from a central control unit located on a floating platform, the first and second USVs; and a step 906 of recording the seismic data with the first and second clusters. The first USV follows its own path and the first cluster follows the first USV, independent of the second USV or the second cluster.

One or more of the exemplary embodiments discussed above disclose using one or more clusters of AUVs for performing seismic recordings. A cluster of AUVs is easier to manage, and the cluster may be brought in the vicinity of obstacles (e.g., an oil well) where traditional surveying systems avoid going. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic survey system for recording seismic signals during a marine seismic survey, the system comprising:
   first and second clusters, each including a set of autonomous underwater vehicles (AUVs);
   each cluster being associated with a corresponding first or second unmanned surface vehicle (USV); and
   a central control unit located on a floating platform and configured to control the first and second USVs,
   wherein the first USV follows its own path and the first cluster follows the first USV independent of the second USV or the second cluster.

2. The system of claim 1, wherein the first cluster has the AUVs arranged in a first pattern and the second cluster has a second pattern, different from the first pattern.

3. The system of claim 1, wherein each of the first and second clusters has less than 100 AUVs.

4. The system of claim 1, wherein the central control unit transmits commands via radio links to the first and second USVs.

5. The system of claim 4, wherein the first and second USVs communicate with acoustic modems with the first and second clusters, respectively.

6. The system of claim 1, further comprising:
   a base station configured to extend a radio range of communication between the first USV and the central control unit.

7. The system of claim 1, wherein the first USV comprises:
   a housing completely immersed underwater and including plural bays for receiving one or more AUVs of the first cluster during the seismic survey.

8. The system of claim 7, wherein the housing comprises:
   in each bay, a locking mechanism for locking an AUV when inside the bay;
   an interface for transferring seismic data from the AUV to a storing device on the housing; and
   a power connector for transferring electric power to the AUV.

9. The system of claim 7, wherein the housing comprises:
   a guiding system for guiding an incoming AUV in a corresponding bay.

10. The system of claim 1, wherein the first USV comprises:
    an acoustic underwater positioning and navigation system for determining a location of each AUV of the first cluster during the seismic survey; and
    an acoustic modem for transmitting a corresponding location to each AUV of the first cluster.

11. The system of claim 1, wherein the first USV detects positions of AUVs of the first cluster and the second USV detects positions of AUVs of the second cluster.

12. The system of claim 1, wherein the first USV follows a first path and the second USV follows a second path and the two paths are different.

13. The system of claim 1, wherein the floating platform is an oil rig and the first and second USVs are remote controlled from the oil rig.

14. A seismic survey system for recording seismic signals during a marine seismic survey, the system comprising:
   first and second clusters, each including a set of autonomous underwater vehicles (AUVs);
   each cluster being associated with a corresponding first or second unmanned surface vehicle;
   a central control unit located on a floating platform and configured to control the first and second unmanned surface vehicles; and
   a source vessel that generates the seismic signals,
   wherein the first unmanned surface vehicle follows its own path and the first cluster follows the first unmanned surface vehicle independent of the second unmanned surface vehicle or the second cluster.

15. A method for recording seismic data using a seismic survey system, the method comprising:
   deploying first and second clusters, each including a set of autonomous underwater vehicles (AUVs);
   assigning to each cluster a corresponding first or second unmanned surface vehicle (USV);
   remote controlling, from a central control unit located on a floating platform, the first and second USVs; and
   recording the seismic data with the first and second clusters,
   wherein the first USV follows its own path and the first cluster follows the first USV independent of the second USV or the second cluster.

16. The method of claim 15, further comprising:
   sending first location information from the first USV to the AUVs of the first cluster; and
   sending second location information from the second USV to the AUVs of the second cluster,
   wherein the location information is related to positions of AUV during the seismic survey.

17. The method of claim 16, further comprising:
   adjusting a trajectory of an AUV based on location information received from a corresponding USV.

18. The method of claim 15, further comprising:
   instructing an AUV of the first cluster to dock in a bay of a housing attached to the first USV.

19. The method of claim 18, wherein the AUV determines by itself a need to dock with the housing.

20. The method of claim 18, further comprising:
   requiring permission from the first USV prior to docking with the housing.

* * * * *